Aug. 6, 1929.  A. E. PEW, JR., ET AL  1,723,368
PROCESS OF COMPLETELY SEPARATING GASOLINE FROM MINERAL OIL
Filed Feb. 23, 1924   5 Sheets-Sheet 3

WITNESS:

INVENTORS
Arthur E. Pew, and
Henry Thomas
BY
ATTORNEYS.

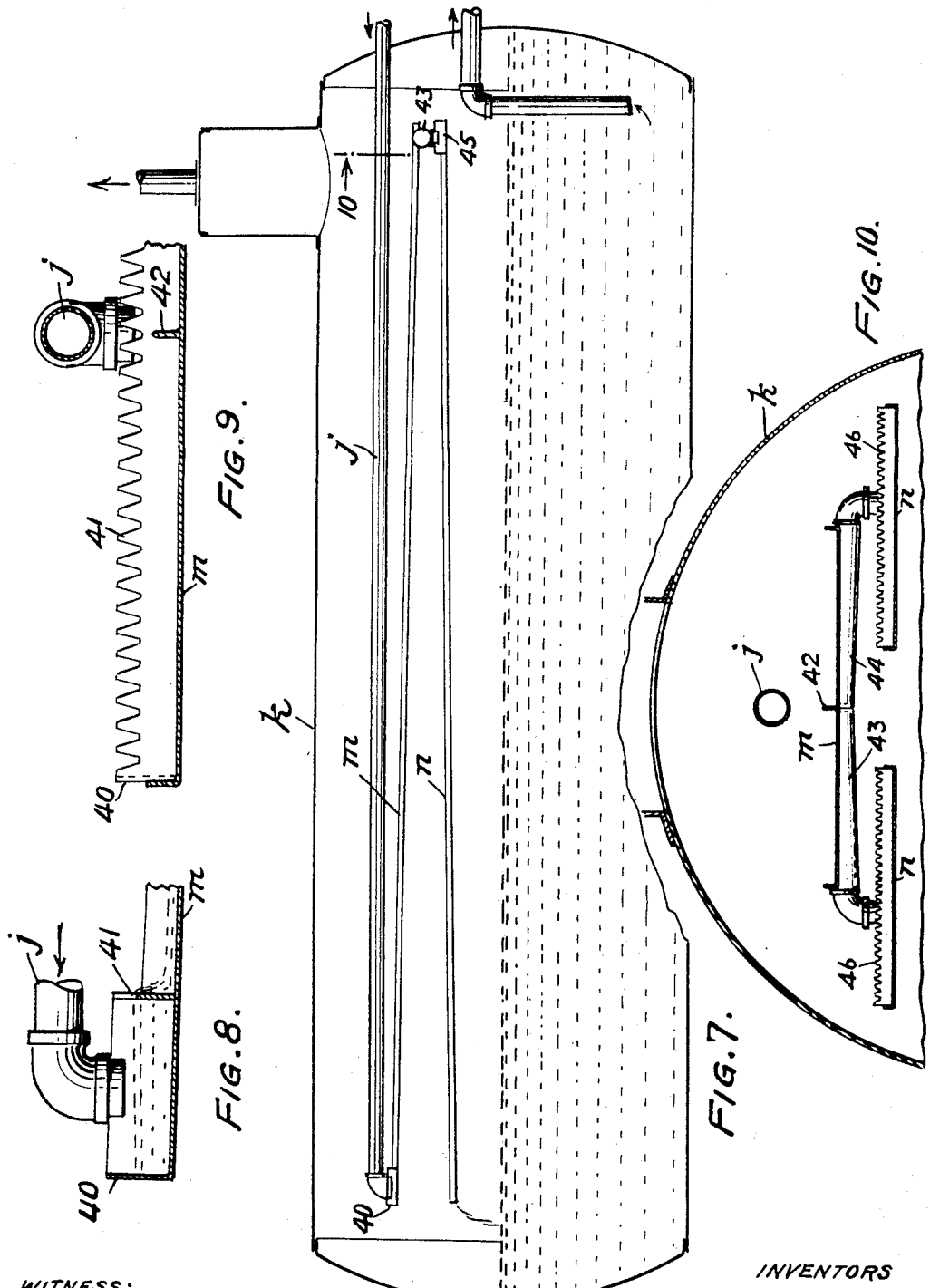

Aug. 6, 1929.   A. E. PEW, JR., ET AL   1,723,368
PROCESS OF COMPLETELY SEPARATING GASOLINE FROM MINERAL OIL
Filed Feb. 23, 1924   5 Sheets-Sheet 5

INVENTORS
Arthur E. Pew, Jr. and
Henry Thomas
BY
Busser and Harding
ATTORNEYS.

Patented Aug. 6, 1929.

1,723,368

UNITED STATES PATENT OFFICE.

ARTHUR E. PEW, JR., OF BRYN MAWR, AND HENRY THOMAS, OF RIDLEY PARK, PENNSYLVANIA, ASSIGNORS TO SUN OIL COMPANY, OF PHILADELPHIA, PENNSYLVANIA, A CORPORATION OF NEW JERSEY.

PROCESS OF COMPLETELY SEPARATING GASOLINE FROM MINERAL OIL.

Application filed February 23, 1924. Serial No. 694,470.

The object of this invention is to provide a new process for separating gasoline from crude oil, whereby a practically quantitative separation of the gasoline may be effected. A further object of our invention is to accomplish this result with a maximum of simplicity and with a minimum expenditure of heat.

An apparatus suitable for carrying out our process is shown in the drawings, wherein—

Figure 2:
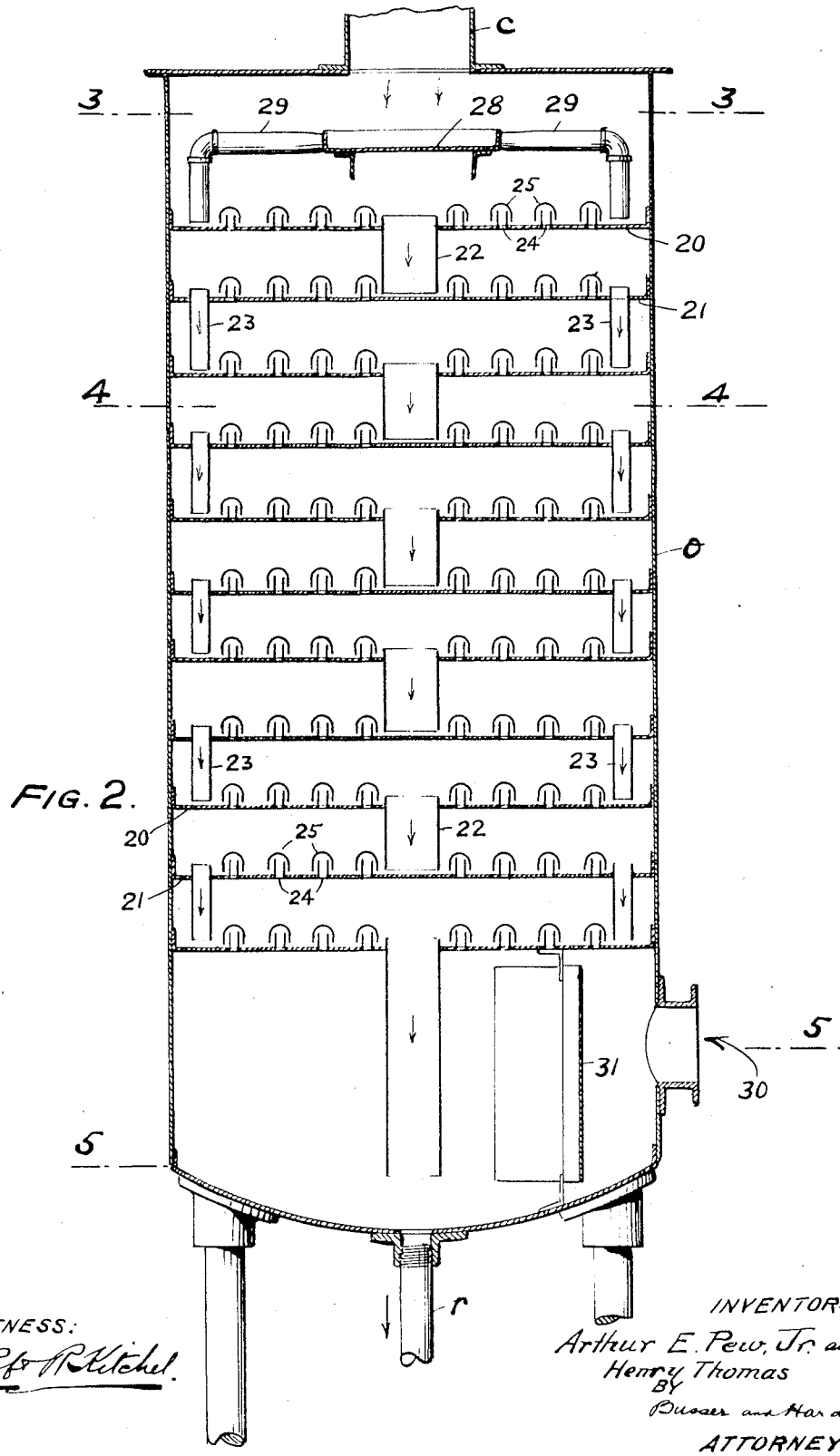
Fig. 2 is a sectional elevation of the fractionating tower for heavy gasoline.
Figure 3:
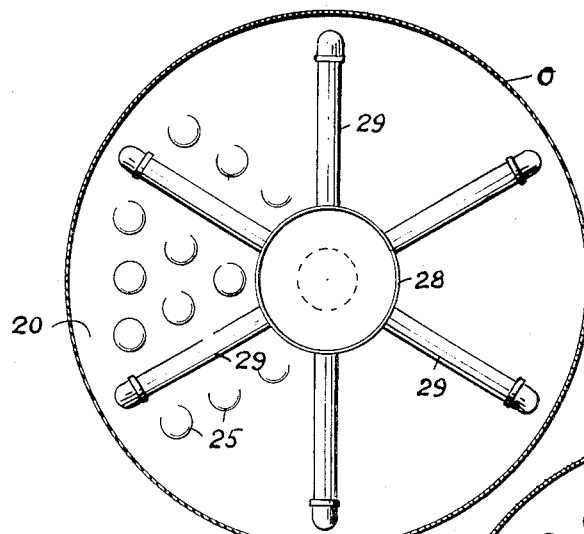
Figure 4:
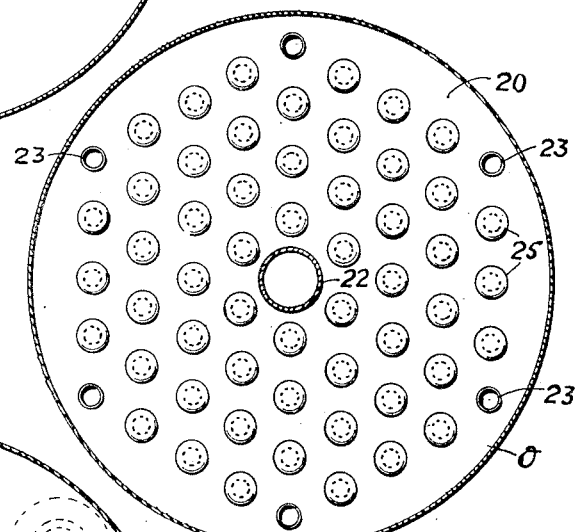
Figure 5:
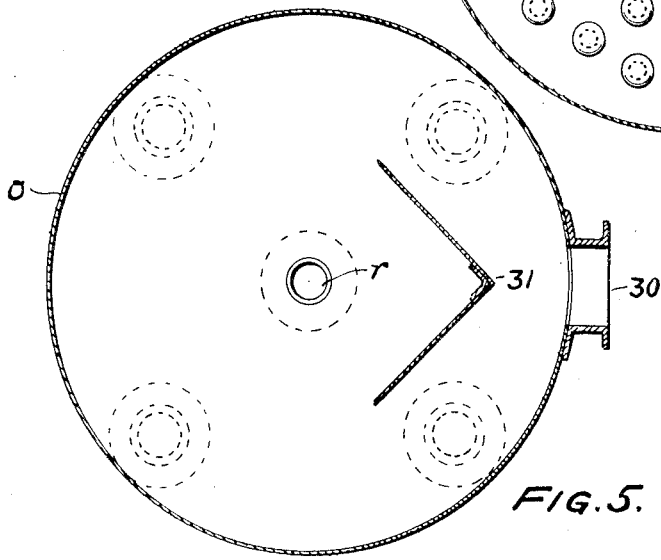

Figs. 3, 4 and 5 are sections respectively on the lines 3—3, 4—4, and 5—5 of Fig. 2.

Figure 6:
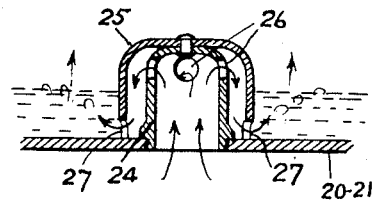

Fig. 6 is a detail sectional elevation of one of the caps for directing vapors through the vapor condensate in the fractionating tower for heavy gasoline and in the upper part of the vaporizing-fractionating tower for light gasoline.

Fig. 7 is a simplified view of the still, including our improved vaporizing pans.

Fig. 8 is a detail sectional side view of the upper and receiving end of the upper vaporizing pan.

Fig. 9 is an end view of Fig. 8.

Fig. 10 is an enlarged section on the line 10 of Fig. 7.

Figure 11:
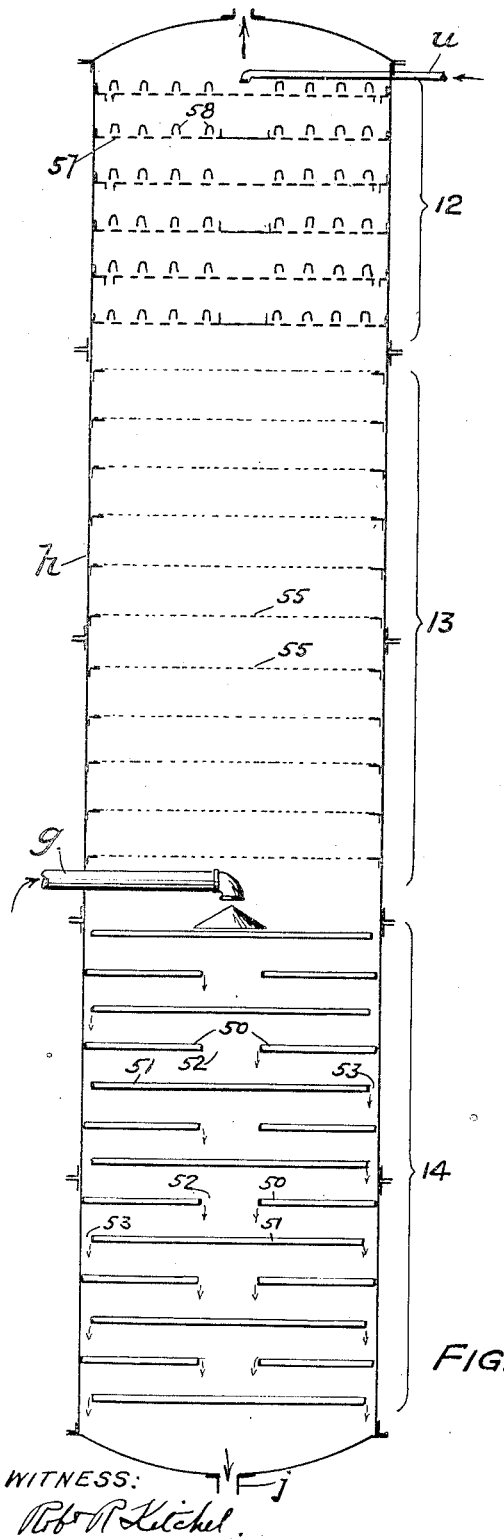

Fig. 11 is a sectional elevation of the vaporizing-fractionating tower for light gasoline.

Figure 12:
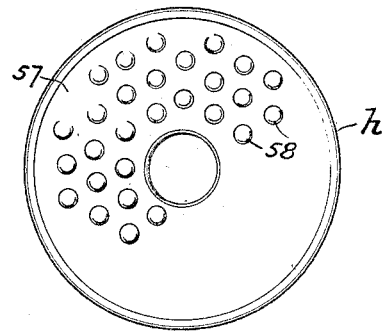

Fig. 12 is a plan of one of the sheets of the upper section of the tower of Fig. 11.

Figure 13:
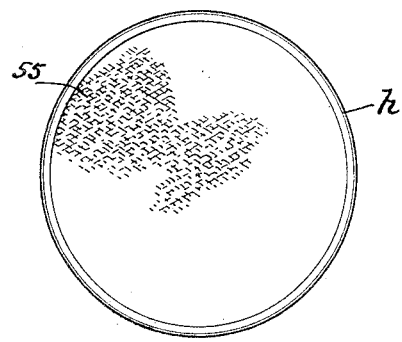

Fig. 13 is a plan of one of the screens of the middle section of the tower of Fig. 11.

Figure 14:
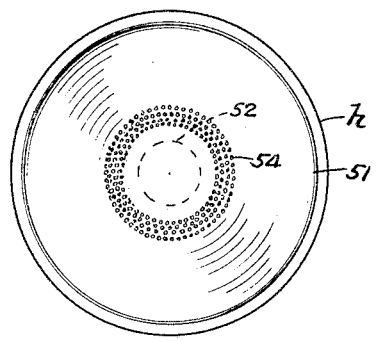

Fig. 14 is a plan of one of the plates of the lower section of the tower of Fig. 11.

Preparatory to a detailed description of the apparatus, the operation will be described (reference being made to Fig. 1) in a very general way.

Crude oil is pumped through pump $a$ and line $b$, thence through reflux condenser $c$ (or partly through by-pass $d$) to line $e$, thence through heat exchangers $f$ (where the lightest fractions are raised to a vaporizing temperature) and line $g$ to the vaporizing-fractionating tower $h$. Uncondensed vapors pass to a condenser $i$. Residual oil passes through line $j$ to still $k$. On the vaporizing pans $m$, $n$, $n$, in the still, the oil is so largely vaporized that no unvaporized fractions suitable for gasoline pass into the body of the still. The vapors pass into the fractionating tower $o$, uncondensed vapors going to the condenser $p$ and reflux through line $r$ to storage. Residual oil from the still $k$ is conveyed by pumps through the heat exchangers $f$.

The fractionating, or bubble, tower $o$ is shown in detail in Figs. 2-6. It contains two series of horizontal plates 20 and 21, the plates 20 and 21 being arranged alternately. Each plate 20 has a central orifice from which depends an open-ended tube or pipe 22. Each plate 21 has orifices near its periphery from which depend open-ended tubes 23. Each pipe 22 or 23 extends also somewhat above the level of the plate from which it depends. Each plate 20 and 21 is also provided with numerous orifices from which project upward one member 24 of a compound cap. The other member 25 of the cap straddles the member 24 and extends to the floor of the plate. See Fig. 6. Member 24 of the cap has orifices 26 near its closed upper end. Member 25 of the cap has orifices 27 in its lower edge. The orifices 26 communicate with the annular space between the two cap members. Above the top plate 20 is a central pan 28 and radiating therefrom are pipes 29 having downward bends extending to near the floor of the upper plate 20.

Vapors entering the tower $o$ at 30 from the still $k$ strike the baffle 31. The vapors rise through the plates by passing through the caps 24—25. The condensate accumulating on each plate overflows through pipe 22 or pipes 23. The level of condensate on each plate is above the orifices 27 in the lower edges of cap members 25 and therefore the vapors passing through the caps are forced to bubble up through the condensate.

Referring now to Figs. 7-10, the still $k$ may be of any suitable type. We have shown a cylindrical still, omitting well known details. The features of novelty in this still are the vaporizing pans, which, as hereinbefore stated, receive the residual oil from the vaporizing-fractionating tower $h$, the oil entering the still through pipe $j$ and discharging on the upper end of pan $m$. This end of pan $m$ carries an oil-receiving cup 40 (see Fig. 8) having a front notched wall 41 (see Fig. 9), over which oil overflows onto the body of the pan $m$. The pan $m$ is provided with a longitudinal partition 42, which maintains half the total volume of flowing oil on each side thereof. At the lower end of pan $m$, half the unvaporized oil discharges through pipe 43 and the other half through pipe 44 (see Fig. 10). The oil from these pipes discharges into receiving cups 45 (similar to 40) having notched walls 46 (similar to 41), the oil overflowing therefrom onto inclined pans $n$, $n$, the lower ends of these pans opening freely into the body of oil in the still.

Because these pans provide an extended surface over which the oil flows in a thin sheet, and because the flowing oil is in intimate contact with the vapors generated in the still, it is found that, with a still temperature of about 520° F., there is a complete vaporization of all the boiling point fractions within the gasoline range, so that none of these fractions ever combines with the oil in the still. This fact is of the utmost importance, in that it dispenses with the necessity of any re-distillation for gasoline of the oil that flows from the still. There is also, of course, considerable vaporization of heavier fractions. All the vapors pass to the fractionating tower $o$.

In Figs. 11–14 are shown the vaporizing-fractionating tower $h$ and its parts.

The lower, or evaporating, section 14 of this tower contains plates 50 and 51 (provided with peripheral flanges) arranged alternately; plates 50 having central orifices 52 and plates 51 being separated from the wall of the tower by annular spaces 53. Each of the plates is provided with a group of fine holes 54 arranged annularly and of a combined area just sufficient to allow oil to percolate therethrough at the desired rate. The oil issuing from pipe $g$ enters tower $h$ at the top of the lower section 14 of the tower. The oil, carrying considerable vapor, passes down section 14, from plate to plate, through the holes 54, the vapors, as they are released, rising, in a staggered path, through orifices 52 and spaces 53. The vapors released in the evaporating section 14 of the tower rise through the screens 55 of the middle section 13 of the tower; the condensed vapors dripping through the screens. The vapors that pass through all the screens are then further fractionated by passing through the upper, or bubbling, section 12 of the tower; which comprises orificed plates 57 provided with orificed caps 58 similar to the caps 24–25 in tower $o$. The vapors escaping from the top of the tower pass to the condenser $i$, as before described.

To supply any deficiency in condensed vapors, as well as to more accurately control the temperature in the tower $h$, oil similar to, or the same as, the distillate from this tower at a regulated temperature may be pumped by pump $t$ through pipe $u$ to the top of tower $h$.

Having described the details of the apparatus, a more specific description of the operation may now be given. The specified rates of flow of oil and the specified temperatures are intended to be illustrative merely, although this data is derived from actual experience. Such data as are given are applicable only to the use of the apparatus for the separation of gasoline from crude oil, although the invention is not limited to the separation of gasoline, as it is applicable, also, to the separation of heavier fractions from which lighter fractions have already been extracted by the same or any other method. It will also be understood that the desirable rate of flow of the oil, temperatures and other factors, will vary with the size of the apparatus, the character of the crude oil, the grades of gasoline intended to be recovered, and the practices of different refiners.

Figure 1:
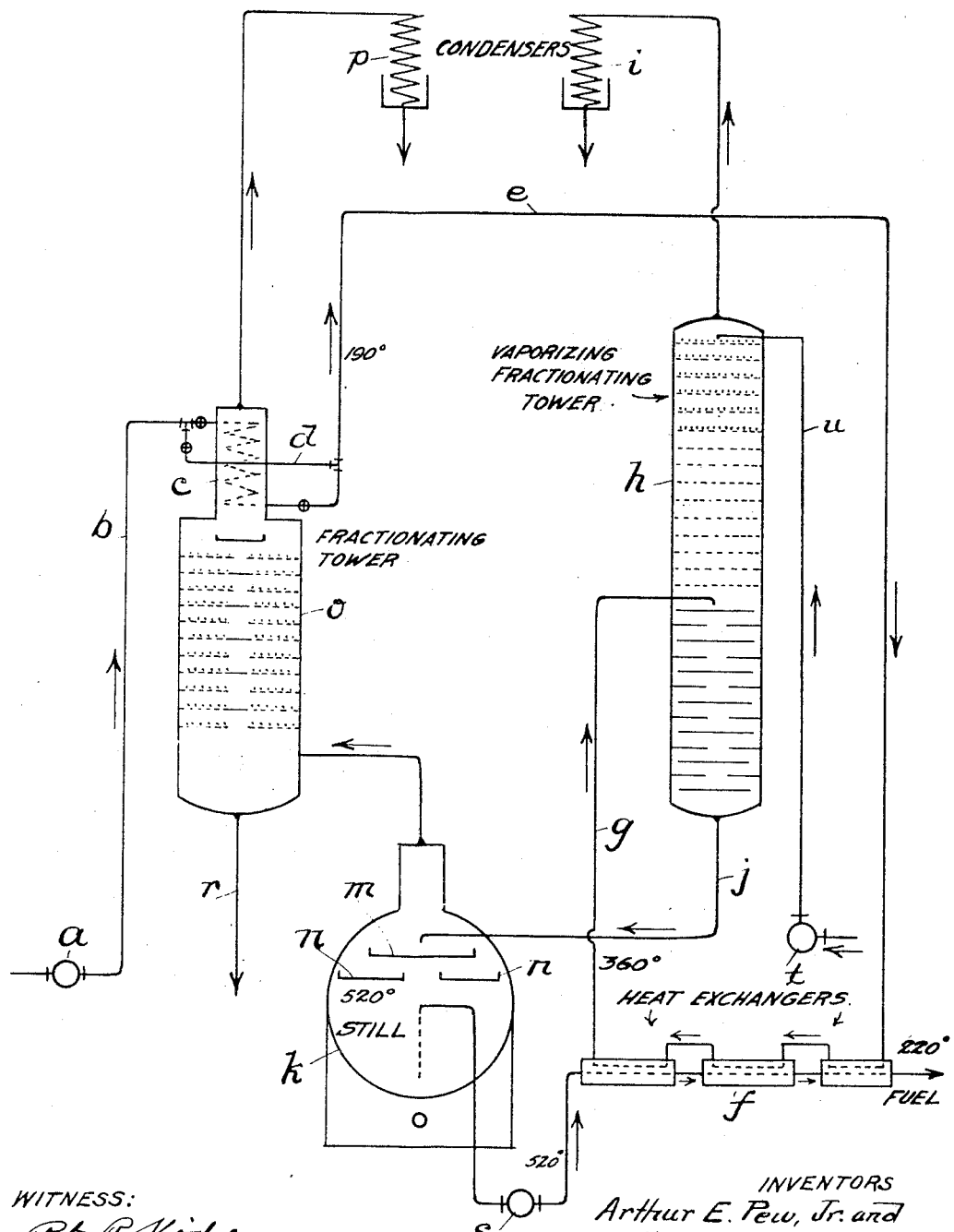
Fig. 1 is a diagram of the apparatus.

Cold crude oil is pumped toward the reflux condenser $c$ at the top of tower $o$ at the rate of about 160 barrels per hour. The amount of crude oil that is allowed to flow through the condenser $c$ depends on the temperatures which it is desired to maintain in the condenser. The remainder of the crude oil is by-passed through line $d$. Valves for hard regulation are shown in Fig. 1, although any known thermostatic control of the division of flow may be utilized. It may be assumed that the crude oil flowing through line $e$ has been raised to a temperature of 190° F. In the heat exchangers the temperature of the flowing crude oil is raised to (say) 360° F. and at that temperature enters the tower $h$ above the lower evaporating section 14 thereof. In this tower about ten per cent of the crude oil will be evaporated and fractionated and will pass, at the rate of about sixteen barrels per hour, to the condenser $i$ as light gasoline.

The residual oil from the tower $h$ flows, at the rate of about 144 barrels per hour, through pipe $j$ into the still $k$, where a temperature of about 520° F. is maintained. At this temperature, and because of the thin spread of the oil over the wide surface and the long path afforded by the evaporating pans $m$, $n$, $n$, and due to the contact of the thin layer of oil with the heated surfaces of the pans and with the vapors constantly forming in the still, all the fractions of the oil comprising the gasoline, as well as some heavier fractions, are vaporized and pass to the bubbling tower $o$. In all, about forty per cent of the crude oil will pass into the bubbling tower at the rate of about sixty-four barrels per hour.

In the tower $o$ about eighteen per cent. of the original crude oil will escape as vapor to the condenser $p$. The reflux will outflow through pipe $r$ to storage. This reflux, which is composed of fractions of higher boiling points than gasoline fractions, comprises about twenty-two per cent of the original crude oil.

The speed of the pump $s$ is governed to maintain the desired level of oil in the still $k$. The residual oil flowing from the still may be used for fuel or may be further distilled. In its passage through the heat exchangers $f$, the fuel oil drops in temperature from about 520° F. to about 220° F.

By the use of the foregoing process and apparatus there is effected a substantially quantitative separation of gasoline with maximum economy in the use of fuel.

Where, in the claims, we refer to the separation of gasoline from crude oil, we do not mean to exclude the equivalent separation of any lighter fraction or fractions of mineral oil from a heavier fraction or fractions thereof; it being intended to claim all the uses to which the invention is adapted.

The process may be simplified by effecting the separation of all the gasoline in the tower $o$, but with the waste of heat involved in elevating the lighter fractions of gasoline to an unnecessarily high temperature.

Having now fully described our invention, what we claim and desire to protect by Letters Patent is:

1. The process of separating relatively light and relatively heavy gasoline from mineral oil which comprises heating a flowing stream of liquid oil to a temperature above the vaporizing temperature of a relatively light constituent thereof and partly vaporizing the oil and fractionating the vapors in a space heated by the oil flowing thereinto and removing the vapors, flowing the residual oil from said space into a second space and therein applying heat to such residual oil by flowing it over an extended surface in a thin layer and collecting it in a pool and simultaneously applying heat to the said pool and to the flowing thin layer of oil and causing the hot vapors driven off by said heat to contact with the flowing thin layer of oil, and flowing the vapors from the second space into a third space and therein fractionating and removing the vapors.

2. The process of separating gasoline from mineral oil which comprises preliminarily heating a flowing stream of oil to a temperature above the vaporizing temperature of a relatively light constituent thereof, flowing the oil so heated into a space heated only by oil flowing thereinto and in said space vaporizing and fractionating the oil, flowing the residual oil into another space and therein heating it to a substantially higher temperature and vaporizing relatively heavier constituents thereof, in a third space fractionating the vapors driven off in the second separation, and regulating the vapor discharge temperature in the last named fractionation by heat exchange between the vapors being fractionated and the stream of oil flowing toward the locus of the first vaporization and fractionation.

3. The process of separating gasoline from mineral oil which comprises heating the oil to a temperature above the vaporizing temperature of a relatively light constituent thereof, flowing the oil so heated into a vertically elongated space between the upper and lower ends thereof wherein the oil carrying considerable vapor flows downward over a succession of extended surfaces and the vapor flows upward and in the flow of vapor above the point of entry of the oil screening and partly condensing the vapors and at a still higher level further fractionating the vapors by bubbling the same through descending oil.

4. The process of separating gasoline from mineral oil which comprises heating the oil to a temperature above the vaporizing temperature of a relatively light constituent thereof, flowing the oil so heated into a vertically elongated space between the upper and lower ends thereof wherein the oil carrying considerable vapor flows downward over a succession of extended surfaces and the vapor flows upward and in the flow of vapor above the point of entry of the oil screening and further condensing the vapors and at a still higher level further fractionating the vapors by bubbling the same through descending oil, and flowing heated oil into the upper part of said space to supply any deficiency in condensed vapors and to also more accurately control the temperature therein.

In testimony of which invention, we have hereunto set our hands, at Philadelphia, Pa., on this 14th day of February, 1924.

ARTHUR E. PEW, Jr.
HENRY THOMAS.